(12) United States Patent
Sommers et al.

(10) Patent No.: US 12,291,757 B2
(45) Date of Patent: May 6, 2025

(54) METHOD FOR THE HEAT TREATMENT OF A METAL BASED ON A PREDICTED AUSTENITE CONTENT TO ACHIEVE AUSTENITE CONTENT WITHIN A QUALITY WINDOW

(71) Applicant: SMS GROUP GMBH, Duesseldorf (DE)

(72) Inventors: Ulrich Sommers, Duesseldorf (DE); Thomas Daube, Duisburg (DE); Alexandre Lhoest, Eupen (BE); Holger Behrens, Erkrath (DE)

(73) Assignee: SMS GROUP GMBH, Duesseldorf (DE)

( * ) Notice: Subject to any disclaimer, the term of this patent is extended or adjusted under 35 U.S.C. 154(b) by 471 days.

(21) Appl. No.: 17/608,923

(22) PCT Filed: Apr. 23, 2020

(86) PCT No.: PCT/EP2020/061376
§ 371 (c)(1),
(2) Date: Nov. 4, 2021

(87) PCT Pub. No.: WO2020/224983
PCT Pub. Date: Nov. 12, 2020

(65) Prior Publication Data
US 2022/0195558 A1    Jun. 23, 2022

(30) Foreign Application Priority Data

May 7, 2019 (DE) .......................... 102019206538.4
Jun. 25, 2019 (DE) .......................... 102019209163.6

(51) Int. Cl.
*C21D 11/00* (2006.01)
*C21D 9/00* (2006.01)
(Continued)

(52) U.S. Cl.
CPC ............ *C21D 11/00* (2013.01); *C21D 9/0018* (2013.01); *C21D 9/46* (2013.01); *C22C 38/02* (2013.01); *C22C 38/04* (2013.01); *G05B 13/04* (2013.01)

(58) Field of Classification Search
CPC ........ C21D 11/00; C21D 9/0018; C21D 9/46; C22C 38/02; C22C 38/04; G05B 13/04
See application file for complete search history.

(56) References Cited

U.S. PATENT DOCUMENTS 4,725,321 A * 2/1988 Ikegami ................. C21D 9/573
148/657
5,148,458 A * 9/1992 Ruud ........................ G01L 1/25
378/70
(Continued)

FOREIGN PATENT DOCUMENTS

CN    101056721 A    10/2007
CN    101056721 A1   10/2007
(Continued)

OTHER PUBLICATIONS

Heimann, WO-2017050311-A1, English translation, 2017 (Year: 2017).*
(Continued)

*Primary Examiner* — Kamini S Shah
*Assistant Examiner* — Jonathan Michael Skrzycki
(74) *Attorney, Agent, or Firm* — Amster, Rothstein & Ebenstein LLP

(57) ABSTRACT

A heat-treatment method for controlling austenite content in steel during conveying, heating and cooling the steel though a furnace. The method includes heating the steel until reaching a first location, then cooling the steel until reaching a downstream second or third location in the furnace. First, a quality window of the austenite content having minimum/ maximum values at the second or third locations is deter- (Continued)

mined. Upstream from the second/third locations, temperature of the steel for the second/third locations is predicted by a heat-transfer equation and/or conveyance speed of the steel through the furnace. The austenite content is then predicted at the second/third locations by metallurgical/data-based modelling using the predicted temperature. The furnace temperature and/or conveyance speed is adjusted when the predicted steel austenite content for the second/third locations is outside the quality window, whereby after the furnace adjustment, the predicted austenite content for the second/third locations falls within the quality window.

20 Claims, 9 Drawing Sheets

(51) Int. Cl.
  *C21D 9/46* (2006.01)
  *C22C 38/02* (2006.01)
  *C22C 38/04* (2006.01)
  *G05B 13/04* (2006.01)

(56) References Cited

U.S. PATENT DOCUMENTS

| | | | | |
|---|---|---|---|---|
| 6,237,205 | B1 * | 5/2001 | Yoshimura | B21B 1/36 |
| | | | | 29/33 Q |
| 6,290,787 | B1 * | 9/2001 | Babbit | C22C 38/04 |
| | | | | 148/541 |
| 6,406,558 | B1 * | 6/2002 | Kurosawa | C22C 38/008 |
| | | | | 148/120 |
| 6,430,461 | B1 * | 8/2002 | Andorfer | B21B 37/00 |
| | | | | 700/148 |
| 11,692,253 | B2 * | 7/2023 | Oliver | C22C 38/44 |
| | | | | 420/61 |
| 2007/0198122 | A1 | 8/2007 | Weinzierl | |
| 2019/0201954 | A1 * | 7/2019 | Kim | C21D 1/26 |

FOREIGN PATENT DOCUMENTS

| | | |
|---|---|---|
| DE | 102016100811 A1 | 3/2017 |
| DE | 102016222644 A1 | 9/2017 |
| EP | 0541825 A1 | 5/1993 |
| EP | 2742158 A1 | 6/2014 |
| JP | S5662917 A | 5/1981 |
| JP | 2012201956 A | 10/2012 |
| WO | 98/18970 A1 | 5/1998 |
| WO | 2004/050923 A1 | 6/2004 |
| WO | 2005/099923 A1 | 10/2005 |
| WO | WO-2017050311 A1 * | 3/2017 ............ C21D 11/00 |

OTHER PUBLICATIONS

International Search Report, dated Jul. 7, 2020 in corresponding International Application No. PCT/EP2020/061376.
Zouhar, G., et al. "Computer-Simulation of Microstructure Development for Thin Slab Caster and Rolling-Mill Products." Stahl Und Eisen 115.1 (1995): 65-67.
CN Search Report mail date Oct. 17, 2022.

* cited by examiner

METHOD FOR THE HEAT TREATMENT OF A METAL BASED ON A PREDICTED AUSTENITE CONTENT TO ACHIEVE AUSTENITE CONTENT WITHIN A QUALITY WINDOW

CROSS REFERENCE TO RELATED APPLICATIONS

This application is a national phase of PCT application No. PCT/EP2020/061376, filed Apr. 23, 2020, which claims priority to DE patent application No. 102019206538.4, filed May 7, 2019, and DE patent application No. 102019209163.6, filed Jun. 25, 2019, all of which are incorporated herein by reference thereto.

BACKGROUND OF THE INVENTION

The invention relates to a method for heat treatment of a metallic product according to the preamble of claim 1.

In the manufacture of metallic products, in particular in the form of strips or sheets, the heat treatment of the product is usually of particular importance because it influences or sets the mechanical properties of the product. The mechanical properties that a metallic product possesses after its manufacture are among the essential criteria for the quality of an end product made from the metallic product. These mechanical properties are essentially determined by the microstructure of the material of the strip.

The production process for manufacturing a metallic product may involve taking into account precise information about the microstructure of the product and its resulting mechanical properties. For example, from EP 2 742 158 B1, it is known to use a computer model or a model-based control in which the available measurable parameters such as temperature and chemical composition as well as rolling forces are used to calculate one or more parameters related to the microstructure of the material or the mechanical properties in order to thereby adjust the manufacturing process. With the technology of EP 2 742 158 B1, mechanical properties can be measured after the annealing process. The disadvantage here, however, is that the results of such a measurement are not taken into account for the annealing of the measured product (e.g. a coil) because the mechanical properties of the product can no longer be changed.

According to another aspect of the state of the art, as for example disclosed in DE 10 2016 222 644 A1, online measurements can be carried out in connection with a method for rolling and/or for heat treatment of a metallic product in order to determine the properties of the strip that are determined by the microstructure of the material. In this way, the manufacturing process is influenced by a control device. In such a process, for example, the slow cooling of the product is regulated as a function of its mechanical properties determined by X-ray measurement. This has the disadvantage that the thermal inertia of a furnace, which is used for heat treatment of the product or for its cooling, only allows reacting to changes of process parameters to a limited degree.

The various influences on the mechanical properties of a metallic product are illustrated in the diagram of FIG. 9.

With regard to the relationships, which are shown for the mechanical properties of a metallic product in FIG. 9, the prior art has the following disadvantages:

a) In the pre-process for manufacturing a metallic product, process parameters may fluctuate or change. The changes within a coil are mostly continuous and can be compensated for by regulating the furnace (heating section or cooling, especially slow cooling) and by measuring the microstructure of the material. Nevertheless, the changes from coil to coil with the same chemical analysis, same steel quality, same thickness and same width can only be compensated inadequately due to the dead time of the furnace, because the above-mentioned fluctuations with regard to the process parameters occur in the pre-process.

b) Changes in the strip thickness and strip width, the steel quality, the annealing temperature and the line speed can occur: To compensate for this, the strip temperature can be set within specified limits when changing cons. Nevertheless, according to the state of the art, the focus is generally only on setting the temperature.

c) There may be changes in the chemistry or the chemical composition of the product. If this occurs within a steel grade/alloy, the strip temperatures must be changed in order to adjust the austenite content within the specified limits. When the alloy is changed via a coil, the chemical analysis changes and a new austenite content usually also has to be set.

One problem existing in the state of the art mentioned above is that, in particular, sudden changes in the material properties of a metallic product, which can occur, for example, when a coil is changed, can only be compensated inadequately if at all. This can be the case when the actual value for the austenite content varies from coil to coil (e.g. due to different chemistry, different or changed pre-process data, line speed, surface properties, etc.) or over the coil length (e.g. changes in the pre-process, line speed, surface properties, transitions in the furnace, coil from transition slabs in the hot rolling mill), while the austenite target value remains the same, In the first case (typically when the line speed changes) there are sudden changes, while in the second case there are changes over the length of the strip, In both cases, a conventional control system, which is known, for example, for a method according to DE 10 2016 222 644 A1, only reacts with a disadvantageous delay, depending on the thermal inertia of the heating or cooling area of the furnace, before the new setpoint for the austenite content of the product is achieved.

FIG. 10 shows a symbolic representation for a change an the mechanical properties of a metallic product, using the example of the resulting tensile strength when the product is, for example subjected to a heat treatment with a method according to DE 10 2016 222 644 A1. In this method, a quality window for the temperature of the product (e.g. in the form of a strip) is determined based on a maximum value and a minimum value, wherein the maximum and minimum values can be calculated from measured values for the temperature of the product. Using the example of the resulting tensile strength of the product or the strip, FIG. 10 illustrates a further disadvantage of the method according to DE 10 2016 222 644 A1 to the effect that the change in mechanical properties (e.g. tensile strength, yield point, elongation at break, etc.) are relatively large. In the illustration of FIG. 10, this is expressed by the relatively large distance between the horizontal lines running parallel to one another, which are arranged above the comment "resulting tensile strength".

SUMMARY OF THE INVENTION

Accordingly, the invention is based on the object of optimizing the heat treatment of a metallic product also in view of possible sudden changes in its material properties.

This object is achieved by a method having the features of the independent claim. Advantageous embodiments of the invention are defined in the dependent claims A method according to the present invention is used for the heat treatment of a metallic product, in particular in the form of a strip or sheet. In this process, the product is fed through a furnace at a predetermined speed in a conveying direction. The furnace device is controlled and/or regulated by means of a control and/or regulating device. In the course of the heat treatment, the product is heated until reaching a first location and then cooled down until reaching a second location or a third location, the second or third location—viewed in the conveying direction of the product—each following the first location. The method includes the following additional steps:

(i) Determining a quality window for the product at the second or third location with regard to the austenite content, the quality window being defined by a minimum value and a maximum value, (ii) Predicting a temperature for the product at the second or third location, in particular by solving a heat transfer equation as a function of a temperature of the product at a position upstream of the second or third location and/or depending on the speed of the product, (iii) Predicting the austenite content of the product at the second or third location by means of a metallurgical and/or data-based model on the basis of the predicted temperature according to step (ii), and (iv) If an austenite content of the product predicted for the second or third location according to step (iii) lies outside the quality window of step (i): Adjustment of at least one zone temperature of the furnace device and/or the speed of the product in the conveying direction by means of the control and/or regulating device such that the austenite content of the product predicted for the second or third location comes to lie or lies within the quality window.

The above-mentioned heat treatment according to the present invention can take place at a first location, at a second location and at a third location. Here, the second location—viewed in the conveying direction of the product—is situated between the first location and the third location. For example, it can be provided for the method according to the invention that the product is heated until reaching the first location, slowly (cooled) cooled between the first location and the second location, and quickly cooled between the second location and the third location.

With regard to the aforementioned step (ii) of the method according to the invention, it is noted that a temperature for the product at the second or third location can be predicted based on solving a heat transfer equation for the named locations. As an alternative, a temperature for the product can also be predicted in step (ii) by means of stored measurements—access to such stored measurements corresponds to reading out a database with regard to data or measurements that were made in advance or have been generated in preparation for the heat treatment at hand.

The invention is based on the essential knowledge that a pre-control takes place on the basis of step (iii), in which the austenite content of the product at the second or third location of the heat treatment is predicted by means of a metallurgical and/or data-based model in order to circumvent the time constant of the furnace equipment used, in particular in the event of sudden changes in the material properties of the product, and thus to achieve a faster adaptation of the heat treatment for the product in view of the predicted austenite content of the product.

It is noted that with the furnace device used for the method according to the invention, both heating and/or cooling of the product is possible when being passed through the furnace device. Correspondingly, the furnace device can be used to selectively, or as a function of certain segments of this furnace device, increase or decrease the temperature of the product, wherein in the course of this, also the temperature gradient, i.e., the heating/cooling speed can be adjusted as a function of time. This means that with the furnace device in connection with the present invention, slow or fast heating of the product and/or slow or fast cooling of the product are possible.

With regard to step (iv) of the method according to the invention, it is emphasized that adjusting a zone temperature of the furnace device according to and within the meaning of the present invention can mean heating and/or cooling of the metallic product. This means that a zone temperature can also mean a cooling zone in which the temperature of the metallic product is reduced. At least one zone temperature is thus adjusted for the purpose of heating or cooling the metallic product, in the latter case, for example, by using a (cooling) liquid and/or a fluid. To cool the product, a device can be used from which a gas mixture of (e.g. mainly) nitrogen and hydrogen is expelled, preferably under pressure, in the direction of a surface or the surfaces of the product in order to thereby reduce the temperature of the product in a targeted manner. Such a device can be arranged in or received within the furnace device. In addition and/or alternatively, it is possible to use water to cool the product, for example in the form of an immersion bath through which the product is passed and/or in the form of cooling liquid that is applied to the surface(s) of the product, preferably under pressure.

In the event that larger changes in the austenite content have been predicted or are necessary, it is useful when performing step (iv) to adjust the speed of the product in the conveying direction or the belt speed, in addition to a zone temperature of the furnace device. Such an adjustment of course also takes into account the slow cooling capacity for the product.

In the method according to the invention, the predicted austenite content of the product, which is present either at the second location of the heat treatment (for example after the slow cooling of the product) or at the third location of the heat treatment (for example after the rapid cooling of the product), is used as the target variable for step (iii). This means that the use of a metallurgical and/or data-based model according to step (iii) enables predicting the austenite content of the product at the second or third location of the heat treatment.

In this context, the determination of a quality window for the product at the second location or at the third location with regard to the austenite content according to step (i) is of particular importance. Such a quality window is defined by a minimum value and a maximum value, derived, for example, from measurement and/or laboratory values for the mechanical properties of the product. For the present invention, the minimum value and the maximum value for the quality window can expediently be determined by measuring at least one mechanical property. Such a mechanical property of the product can be the tensile strength and/or yield point and/or elongation.

Another essential basis of the method according to the invention is the fact that the temperatures for the product at the second location or at the third location, as provided in step (ii), can be achieved with high accuracy by solving a heat transfer equation. For this purpose, the use of a mathematical model is known according to the state of the art and, for example described in the article by A. L. Lhoest and K.-G. Butzbach "Mathematical model enables higher system productivity and better strip quality" (published in "stahl and Eisen" 129 (2009) No. 11, pages 79-89), whereby this article is expressly referred to at this point.

The present invention represents a paradigm shift with regard to the heat treatment of a metallic product, from temperature control to microstructure control, whereby according to step (iv) at least one zone temperature of the furnace device and/or the speed of the product is adjusted in the conveying direction by means of the control and/or regulating device, depending on whether the austenite content of the product predicted according to step (iii) for the second location or for the third location is outside the quality window of step (i). This makes it possible, particularly in the case of transitions from one coil to the next, or in particular in the case of significant changes within one and the same coil, to at least reduce or even exclude scrap of material. In the event of sudden changes in the input parameters (e.g. chemistry of the steel strip or other properties from the pre-processes such as hot rolling when changing coils in the heat treatment process), the aforementioned pre-compensation, which is largely based on steps (iii) and (iv) of the method according to the invention, the proportion of scrap length of the product (e.g., in the form of a strip or sheet) can be at least reduced.

In an advantageous development of the invention, the type of calculation for step (ii) and/or for step (iii) can be selected faster than in real time. This makes it possible to use the method according to the invention to "look into the future" for the heat treatment of the product, namely with regard to the predicted austenite content of the product at the second or third location of the heat treatment.

In an advantageous development of the invention, the adjustment according to step (iv) takes place in the manner of a regulation. Here, the control and/or regulating device takes on the function of a regulator, wherein a zone temperature of the furnace device and/or the speed at which the product is transported or moved in the conveying direction through the furnace device serve(s) as manipulated variable (s).

The present invention achieves conducting regulation of the furnace device in a forward-looking manner by a combination regulation for the austenite content of the product with the aid of the control and/or regulating device and the handling or consideration of the setpoint values for the austenite content. As a result, the best possible mechanical properties are achieved for the product, especially in the case of transitions between two coils.

The method according to the present invention therefore particularly suited for the case that a coil change is imminent for the product, preferably at the second location or at the third location of the heat treatment.

In an advantageous development of the invention, an austenite target value is determined for the product, which is within the quality window of step (i). For this purpose, it is useful that such a target value for the austenite content is calculated based on a measured value of at least one mechanical property of the product. As explained above, such a mechanical property of the product can be the tensile strength and/or yield point and/or elongation. In any case, it is useful for carrying out step (iv) of the method according to the invention when the difference between the austenite content predicted at the second or third location of the heat treatment and the target value is as small as possible, whereby, for example, the operating mode of the furnace device when transitioning between two coils is optimized. Ideally, the aforementioned regulation of at least one zone temperature of the furnace device and/or the speed of the product in the conveying direction takes place by means of the control and/or regulating device in such a way that the predicted austenite content of the product at the second or third location of the heat treatment corresponds to the mentioned target value within the quality window of step (i), or in any case deviates only minimally from this target value.

In an advantageous further development of the invention, it can be provided that the austenite content of the product that is present at the second location of the heat treatment is taken into account when performing the aforementioned steps (i) to (iv). This means that the predicted austenite content of the product is taken into account at the end of the slow cooling. Correspondingly, in step (ii) the temperature of the product at the end of the slow cooling is also predicted for this case, and then in step (iii), the associated austenite content is predicted for the location of the heat treatment where the slow cooling of the product ends or is completed by means of the metallurgical and/or data-based model, on the basis of the upstream temperature prediction.

In an advantageous development of the invention, the heat treatment is carried out for a product made of steel which has a mass content of silicon of at least 0.3% and a mass content of manganese of at least 1%.

For the aforementioned type of steel, it is useful in the context of the present invention if the mass fraction of silicon is at least 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, 0.5%, 0.51%, 0.52%, 0.53%, 0.54%, 0.55%, 0.56%, 0.57%, 0.58%, 0.59%, 0.6%, 0.61%, 0.62%, 0.63%, 0.64%, 0.65%, 0.66%, 0.67%, 0.68%, 0.69%, 0.7%, 0.71%, 0.72%, 0.73%, 0.74%, 0.75%, 0.76%, 0.77%, 0.78%, 0.79%, 0.8%, 0.81%, 0.82%, 0.83%, 0.84%, 0.85%, 0.86%, 0.87%, 0.88%, 0.89%, 0.9%, 0.91%, 0.92%, 0.93%, 0.94%, 0.95%, 0.96%, 0.97%, 0.98%, 0.99%, 1% or up to 1.5%. This means that the mass fraction of silicon can assume the values mentioned above, in the sense of a lower limit.

In an advantageous development of the invention, the mass fraction of manganese for the mentioned steel type can be at least 1.01%, 1.02%, 1.03%, 1.04%, 1.05%, 1.06%, 1.07%, 1.08%, 1.09%, 1.1%, 1.11%, 1.12%, 1.13%, 1.14%, 1.15%, 1.16%, 1.17%, 1.18%, 1.19%, 1.2%, 1.21%, 1.22%, 1.23%, 1.24%, 1.25%, 1.26%, 1.27%, 1.28%, 1.29%, 1.3%, 1.31%, 1.32%, 1.33%, 1.34%, 1.35%, 1.36%, 1.37%, 1.38%, 1.39%, 1.4%, 1.41%, 1.42%, 1.43%, 1.44%, 1.45%, 1.46%, 1.47%, 1.48%, 1.49%, 1.5%, 1.51% or up to 2%. This means that the mass fraction of manganese can assume the values mentioned above, in the sense of a lower limit.

In an advantageous further development of the invention, it is possible for the mentioned steel type that the sum of the mass fractions of silicon and manganese is at least 1.3%. Advantageously, the sum of the mass fractions of silicon and manganese can be at least 1.31%, 1.32%, 1.33%, 1.34%, 1.35%, 1.36%, 1.37%, 1.38%, 1.39%, 1.40%, 1.41%, 1.42%, 1.43%, 1.44%, 1.45%, 1.46%, 1.47%, 1.48% 1.49%, 1.50%, 1.3% 1.51%, 1.52%, 1.53%, 1.54%, 1.55%, 1.56%, 1.57%, 1, 58%, 1.59%, 1.6%, 1.61%, 1.62%, 1.63%, 1.64%, 1.65%, 1.66%, 1.67%, 1, 68%, 1.69%, 1.7%, 1.71%, 1.72%, 1.73%, 1.74%, 1.75%, 1.76%, 1.77%, 1.78%, 1.79%, 1.8%, 1.81%, 1.82%, 1.83%, 1.4%, 1.5%, 1.86%, 1.87%, 1.88%, 1.89%, 1.9%, 1.91%, 1.92%, 1.93%, 1.94%, 1.95%, 1.96%, 1.97%, 1.98%, 1.99%, 2%, 2.01% or up to 2.5%. This means that the sum of the mass fractions of silicon and manganese can assume the values mentioned above, in the sense of a lower limit.

In an advantageous development of the invention, it can be provided that at least one inductor is provided for the heat treatment of the product, which inductor is controlled or regulated by the control and/or regulating device. Such an inductor can be arranged either within the furnace device and/or—viewed in the conveying direction of the product—upstream and/or downstream of the furnace device, Such an inductor is expediently a transverse inductor which enables introduction of high energy densities into the metallic product or strip/sheet.

In an advantageous development of the invention, it can be provided that the austenite content for the product is measured at the second and/or third location. The measurement of the austenite content at the second and/or third location is preferably carried out non-destructively, in particular by using X-rays. Such a measurement of the austenite content for the product at the second and/or third location makes it possible for the present invention to verify the austenite proportion which has been predicted in accordance with step (iii) in order, if necessary, to adjust or optimize as a function thereof the regulation according to step (iv).

BRIEF DESCRIPTION OF THE DRAWING

Exemplary embodiments of the invention are described in detail below with reference to a schematic drawing. It is shown in.

DETAILED DESCRIPTION OF PREFERRED EMBODIMENTS

Figure 1:
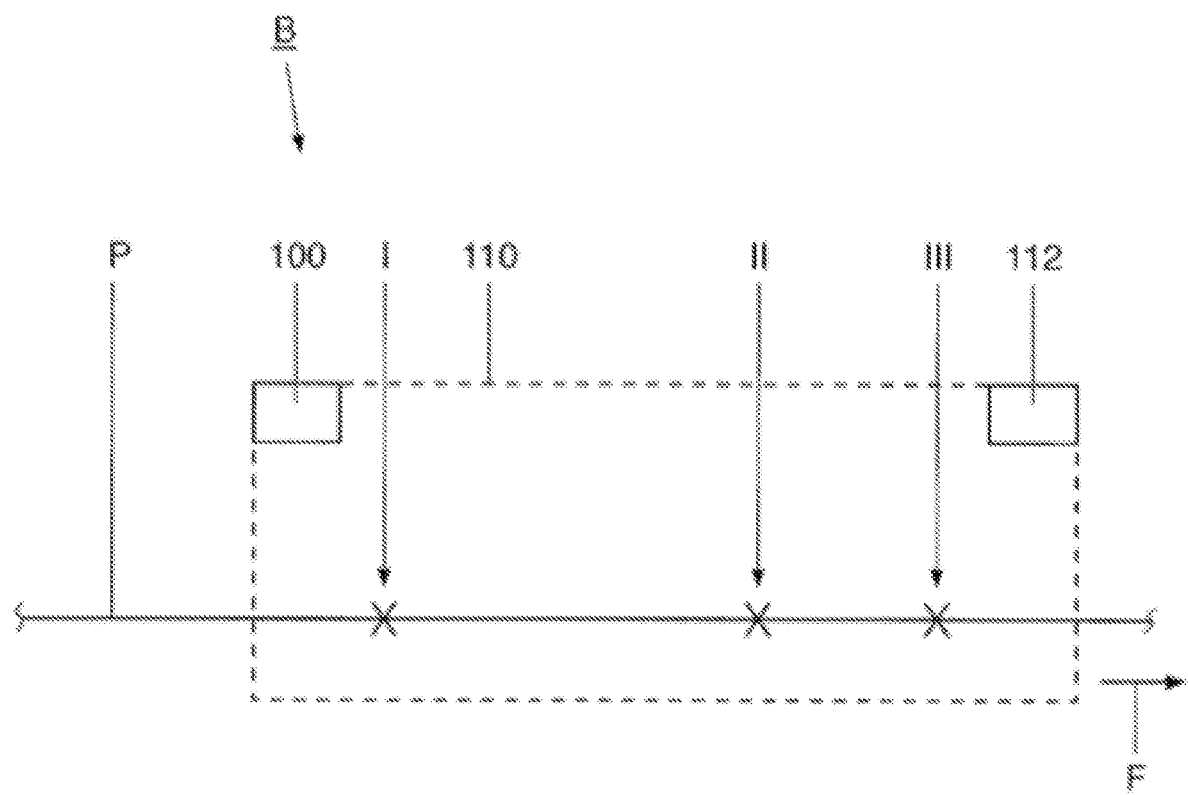
FIG. 1 a simplified side view of a processing line for the heat treatment of a metallic product using a method according to the present invention, FIG. 2 a block diagram for a control and/or regulating device which is used in the processing line of FIG. 1, FIG. 3 a part of the control and/or regulating device from FIG. 2 according to a modified embodiment, FIG. 4 a diagram for a temperature during the heat treatment according to the method according to the invention, as a function of time or furnace length, FIG. 5 the diagram from FIG. 4, supplemented by explanations relating to the microstructure of the heat-treated metallic product, FIG. 6 a diagram for a temperature during the heat treatment according to the method according to the invention according to a modified embodiment, as a function of time or furnace length, FIG. 7 a diagram for the austenite proportion as a function of a cumulative coil length, this austenite proportion changing during the heat treatment of a metallic product with the one according to the invention, FIG. 8 a symbolic representation of the resulting tensile strength that is established in the course of the method according to the invention based on an austenite content of the product after slow cooling, FIG. 9 a diagram to illustrate influences according to the prior art on the mechanical properties of a metallic product during its manufacture or heat treatment, and FIG. 10 a symbolic representation of the resulting tensile strength which is established in the course of a conventional method based on a strip temperature of the product after slow cooling.

In the following, preferred embodiments of a method according to the invention are explained with reference to FIGS. 1-8, with which a heat treatment is carried out for a metallic product P in a processing line B, which is equipped with a control and/or regulating device 100 and a furnace device 110 controlled by the control and/or regulating device. The same features in the drawing are given the same reference numerals. It is noted that the drawing is only shown in a simplified manner and, in particular, without a scale.

FIG. 1 shows, symbolically simplified, a processing line B along which a metallic product P is subjected to a targeted heat treatment. In the course of this heat treatment, the product P is heated and then cooled again.

Figure 2:
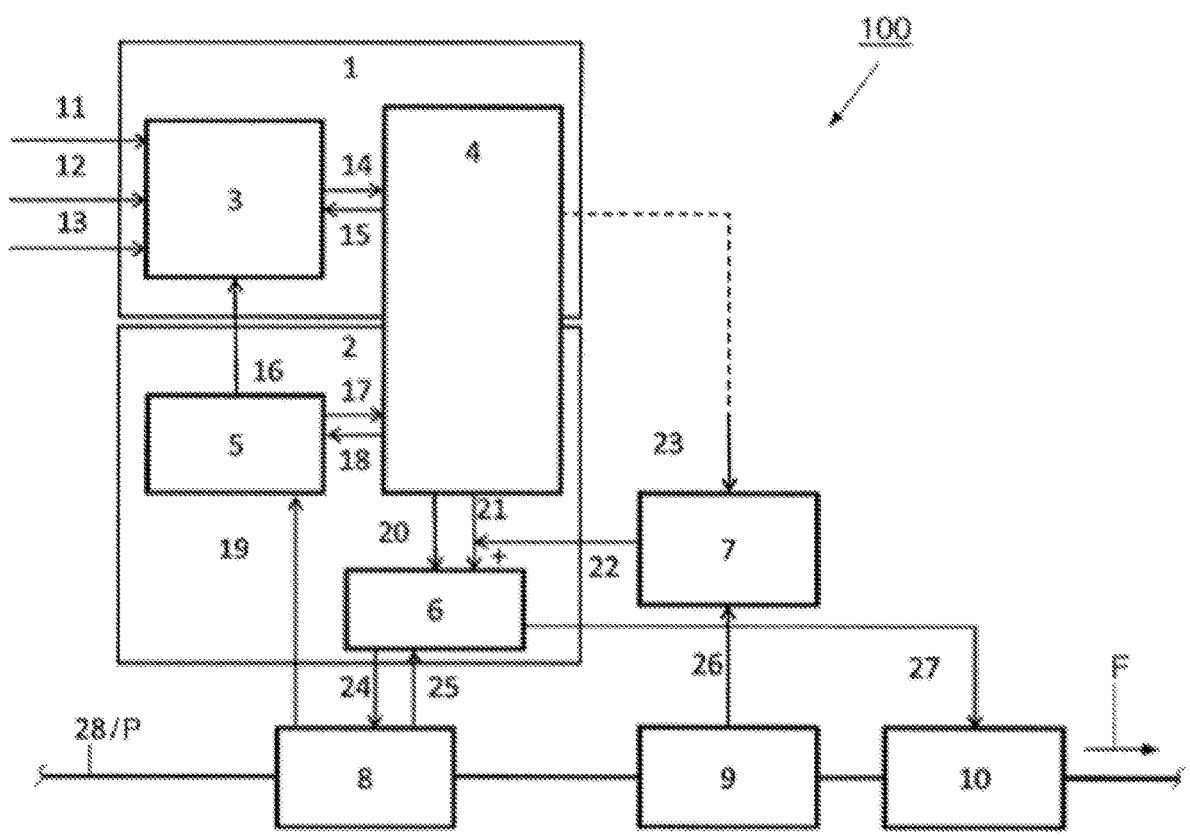

The product P is moved in the processing line B in a conveying direction, symbolized in FIG. 1 and in FIG. 2 with arrow "F". Here, product P is subjected to heat treatment along the processing line B at or between different locations. In particular, a first location I, a second location II and a third location III are provided for this purpose, wherein these locations are each symbolized in a simplified manner in the illustration of FIG. 1 by an "X". FIG. 1 shows that the second location II—viewed in the conveying direction F of the product P—is situated between the first location I and the third location III.

The processing line B is equipped with a control and/or regulating device 100 and a furnace device 110. In the illustration of FIG. 1, the furnace device 110 is symbolized in a simplified manner by a rectangle with dashed lines.

In order to carry out a method according to the invention and the heat treatment of the product provided for this purpose, the furnace device 100 is controlled and/or regulated in a targeted manner by the control and/or regulating device 100, which will be explained in more detail below.

In the course of its heat treatment along the processing line B, the product P is passed through the furnace device 110. With the furnace device 110 it is possible to heat and/or cool the product P in a targeted manner. In the process according to the invention, as explained above, the product P can be cooled by using a cooling gas (e.g. a mixture of nitrogen and hydrogen) and/or by using a cooling liquid (e.g. in the form of an immersion bath, or application of the cooling liquid on surfaces of the product via nozzles), for example within the furnace device, upstream of the furnace device and/or downstream of the furnace device, in each case viewed in the conveying direction F of the product.

An inductor 112 can be used for the method according to the invention. Such an inductor 112 can be arranged within the furnace device 110, symbolized in FIG. 1 by a rectangle. With regard to the positioning of the rectangular symbol for the inductor 112 at the top right within the dashed rectangle 110 for the furnace device, it is pointed out that this positioning does not correlate with the actual spatial arrangement of the inductor 112 within the furnace device 110. In any case, the inductor 112 is used within the furnace device 110 at a location where a high energy density for heating the product P in a short time is desired. For this purpose, the inductor 112 is preferably designed as a transverse inductor.

To carry out a method according to the present invention, it can be provided that the product P is heated or its temperature increased until reaching the first location I. Thereafter, the product P is slowly cooled between the first location I and the second location II. The product P is then rapidly cooled between the second location II and the third location III. A corresponding temperature profile for the product P as a function of time or the length of the furnace device 110 is shown in each of the representations of FIGS. 4, 5 and 6 and is explained separately below.

FIG. 2 shows a schematic diagram for the control and/or regulating device 100. The individual elements which are part of this control and/or regulating device 100 and the processes or items associated therewith for carrying out a method according to the present invention, are provided with the following reference symbols or explained, in the sense of a legend:

P Metallic product (e.g. strip or sheer), also designated with "28";
1 Austenite content calculation (for the example of slow cooling according to the first embodiment of the method according to the invention, otherwise model for the variable that the measuring device 9 measures);
2 Strip temperature calculation;
3 Prediction of austenite content (for the example of slow cooling according to the first embodiment of the method according to the invention, otherwise model for the variable that the measuring device 9 measures);
4 Specified strip temperatures;
5 Predicted strip temperatures;
6 Controllers for zone temperatures of the furnace device 110 (this also includes the cooling zones) and/or for the speed of the product P in the conveying direction F (=strip speed);
7 Regulator with austenite content (for the example of slow cooling according to the first embodiment of the method according to the invention, otherwise model for the variable that the measuring device 9 measures);
8 Slow cooling and areas upstream thereof;
9 X-ray measuring device
10 Fast cooling and areas downstream thereof;
11 Quality window for austenite content (for the example of slow cooling according to the first embodiment of the method according to the invention, otherwise for the variable that the measuring device 9 measures);
12 Chemical composition of the product P;
13 Pre-process data;
14 Predicted austenite content;
15 Specifications for the planned mode of operation of the furnace device 110;
16 Predicted strip temperatures;
17 Predicted strip temperatures;
18 Specifications for the planned mode of operation of the furnace device 110;
19 Furnace zone temperatures and strip temperatures;
20 Strip temperatures (for the example of strip temperatures apart from slow cooling, i.e. e.g. holding temperature, heating temperature, rapid cooling temperature);
21 Pre-control value for a specific strip temperature, on which the controller for the austenite content acts (for the example strip temperature after slow cooling);
22 Controller output of controller 7, which is added to the pre-control value 21. (for the example strip temperature after slow cooling);
23 Quality window for austenite content (for the example of slow cooling according to the first embodiment of the method according to the invention, otherwise for the variable that the measuring device 9 measures);
24 Specification for furnace zone temperatures (for example for slow cooling and areas upstream thereof);
25 Furnace zone temperatures and strip temperatures;
26 Austenite content (measured by the X-ray measuring device 9); and
27 Specifications for furnace zone temperatures (for example for rapid cooling and areas downstream thereof, according to the second embodiment of the method according to the invention).

In the following, a main variant of a first embodiment of the method according to the invention is explained in more detail, which is preferably carried out for dual-phase steels or complex-phase steels. The temperature profile for the product P, which is established by the heat treatment within processing line. B, is shown qualitatively in the diagrams of FIG. 4 and FIG. 5.

As mentioned above, the product P is first heated until reaching to the first location I in the method according to the invention. This heating of the product P can expediently take place by or in the furnace device 110, and corresponds to the rising part at the beginning of the temperature profile in the diagram of FIG. 4. Following this, the product is slowly cooled between the first location I and the second location II, before the product is then rapidly cooled between the second location II and the third location III.

Figure 4:
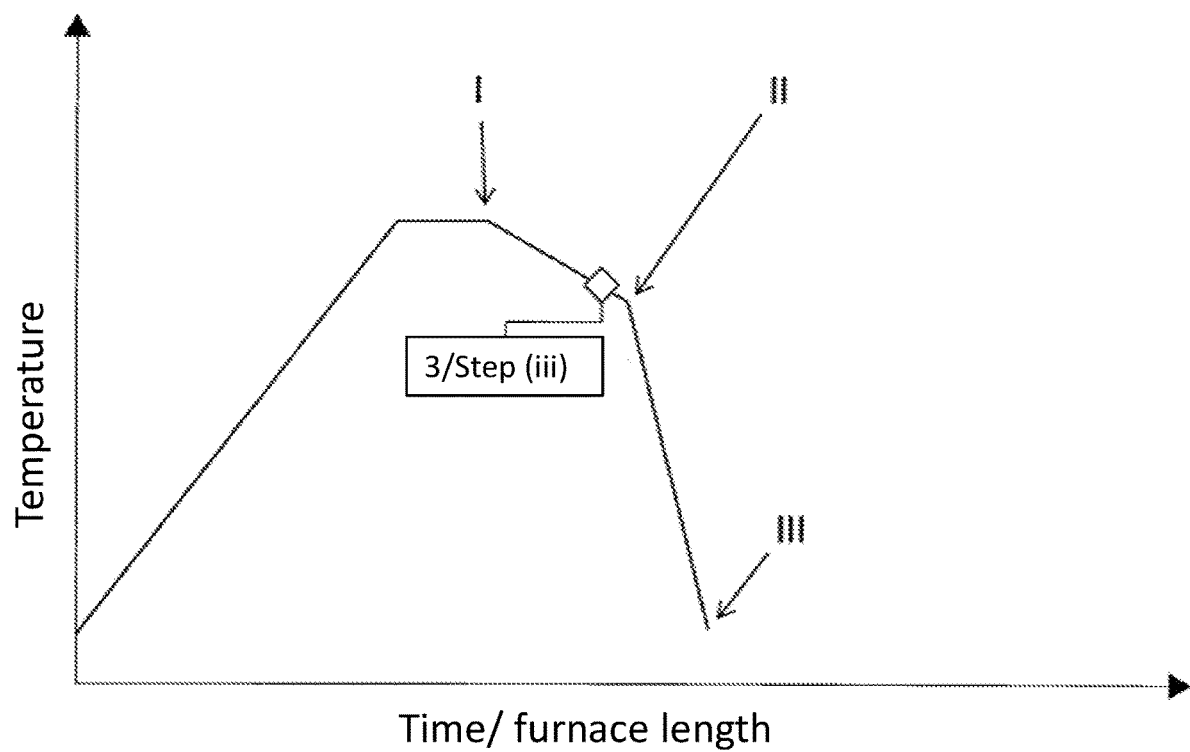

To clarify the above-mentioned heating and cooling processes for the diagram of FIG. 4, the first, second and third location are each denoted by I, II and III, adjacent to its graph for the temperature profile. In particular, the negative slope for the temperature profile between locations I-II and II-III makes clear that the product is cooled between these locations.

Figure 5:
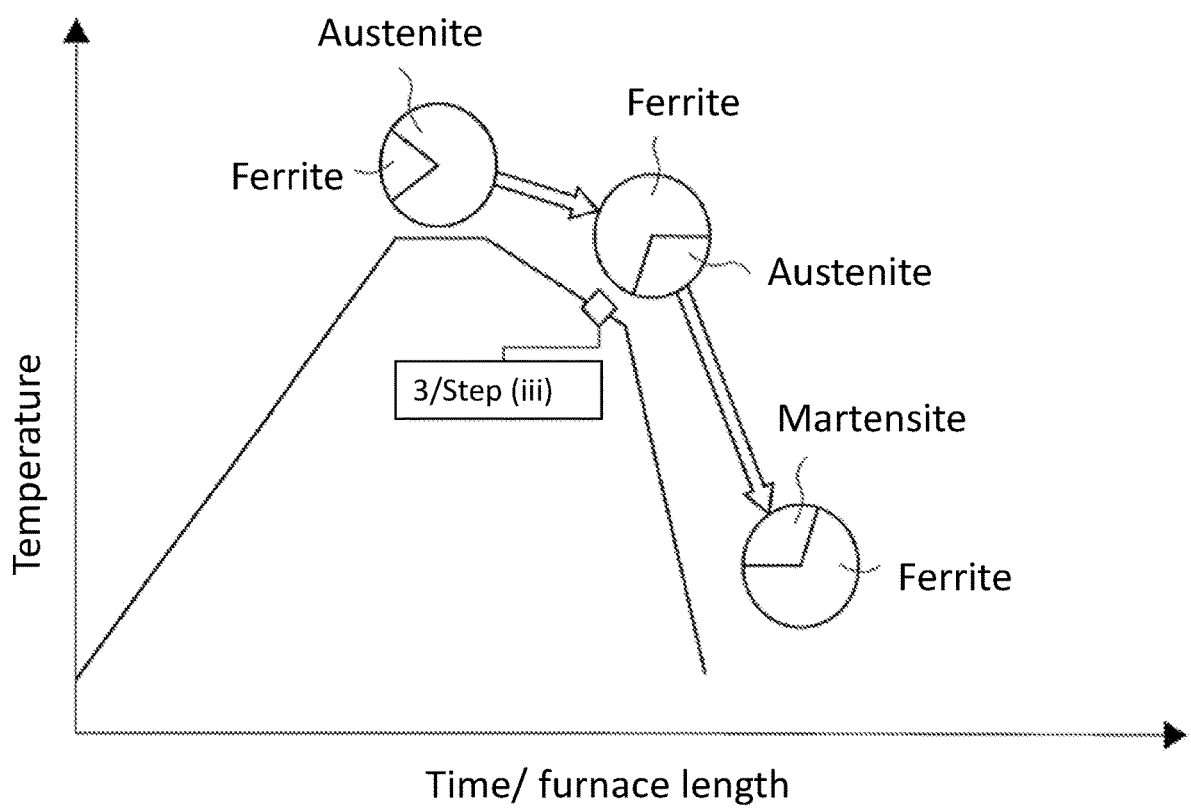

The diagram of FIG. 5 corresponds to that of FIG. 4, wherein the contents of austenite, ferrite and martensite in the microstructure of the product P at the various locations during the mentioned heat treatment are illustrated quantitatively in FIG. 5 by corresponding circular symbols.

The method according to the first embodiment is characterized in that an austenite content of the product P is predicted for location II at which the slow cooling for the product P has ended. With regard to this predicted austenite content, the method according to the invention is then used to check whether this austenite content lies within a desired target range or corresponds to a desired target value, wherein when a deviation from the target range or target value is detected, at least one zone temperature of the furnace device 110 and/or the speed of the product in conveying direction F is adjusted and preferably regulated in such a way that the austenite content of the product P predicted for the second location II is within a desired quality window for the target value of the austenite content.

In addition to the processes that are already self-explanatory from the block diagram of FIG. 2 and the legend provided therefore, the following information is provided for carrying out the method according to the invention according to the first embodiment:

In a step (i), a quality window with regard to the austenite content is determined for the product P at the second location II. To determine this quality window, a maximum value and a minimum value are preferably calculated on the basis of measured values of the product P determined in a laboratory. The difference between the maximum value and the minimum value then defines the quality window in relation to the austenite content of the product, which content should be present at location II (i.e. after completion of the slow cooling). Advantageously, a target value is also determined or calculated, which lies between the maximum value and the minimum value and thus within the mentioned quality window.

Figure 8:
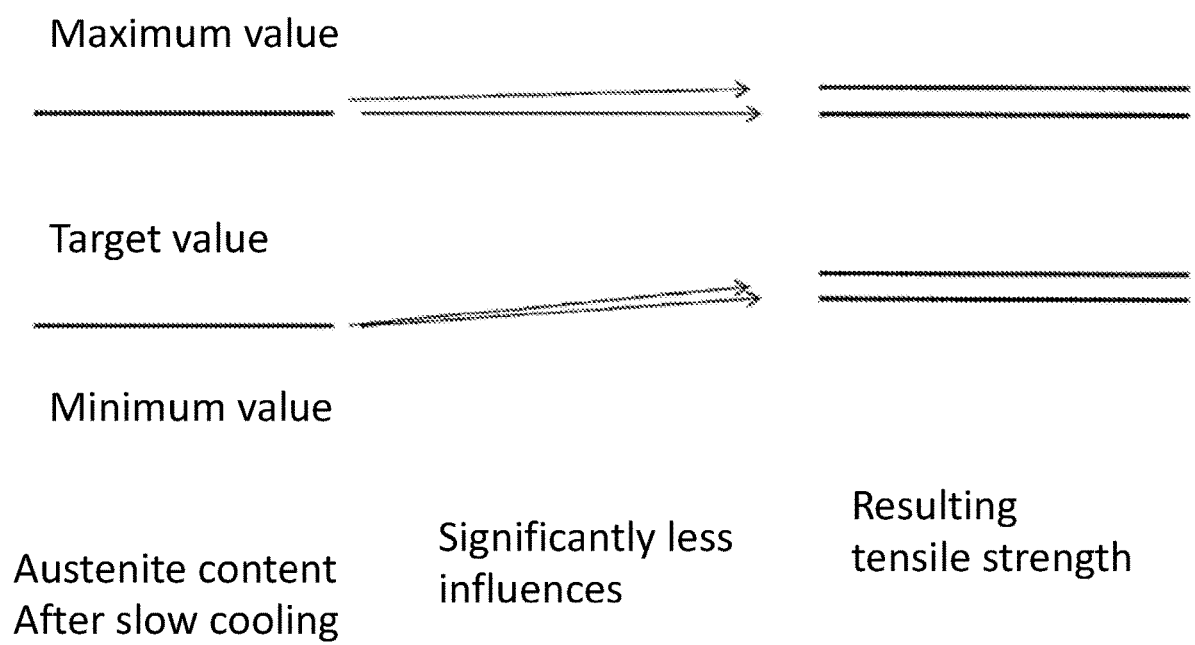
Figure 9:
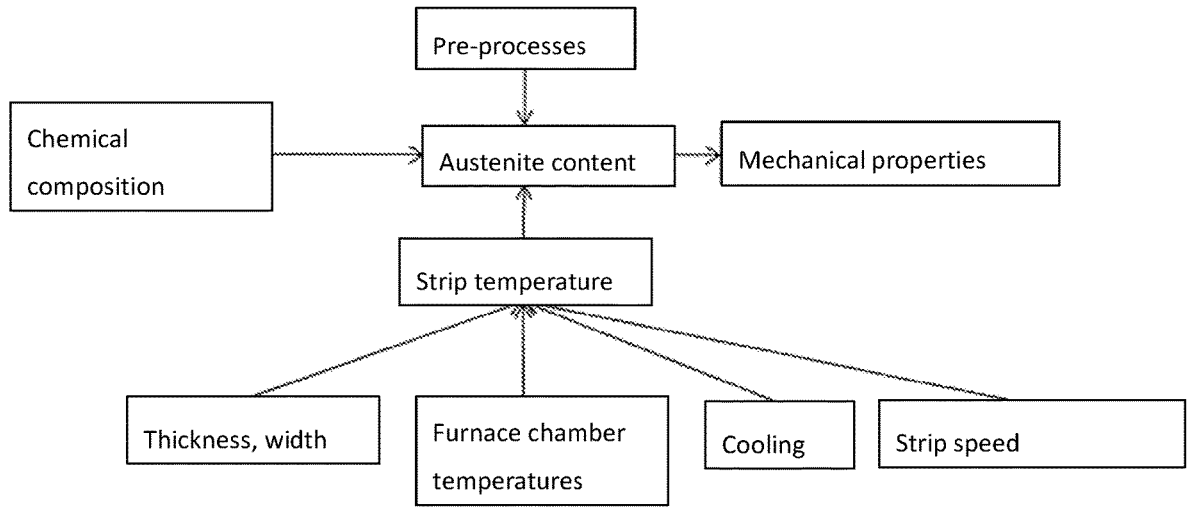

The above-mentioned quality window for the austenite content after slow cooling is also shown in the illustration of FIG. 8 (in the left-hand area thereof). The same also applies to the target value, which, as explained, is between the maximum value and the minimum value.

To calculate or determine the aforementioned austenite content at location H, the control and/or regulating device 100 is equipped with a block 1 (e.g. a model or program) according to FIG. 2 to predict the austenite content. The arrow 11, which points in the direction of block 3, symbolizes that the previously determined quality window for the austenite content is taken into account for the prediction of the austenite content.

In a step (ii) of the method according to the first embodiment, a temperature for the product P at the second location II is predicted by solving a heat transfer equation—in a manner known per se. As already explained above, this prediction of the temperatures for the product P can also be carried out by means of stored measurements. In any case, this temperature prediction takes place as a function of a temperature of the product P at a position upstream of the second location II, e.g. in the processing line B. For this purpose, the control and/or regulating device 100 is equipped with a block 2 (e.g. model or program) for the strip temperature calculation. The temperatures for the product P (also referred to as "strip temperatures" in FIG. 2) are predicted by block 5, wherein the strip temperatures predicted by block 5 are on the one hand then transferred to block 3, symbolized in FIG. 2 by arrow "16", and on the other hand, symbolized in FIG. 2 by the arrow "17", are transferred to a block denoted in FIG. 2 with the reference symbol "4" (according to the legend to FIG. 2: "specified strip temperatures").

After block 3 has received the data for the strip temperatures predicted at location II, this block 3 is now used in a step (iii) to predict the austenite content of the product in the second position II on the basis of the temperature predicted in step (ii) using a metallurgical and/or data-based model. In the curve for the temperature profile of FIG. 4, this is also indicated by the designation "3/step (iii)", which is mentioned at the end of the slow cooling. The austenite content thus predicted, symbolized in FIG. 2 by the arrow "14", is transferred from block 3 to block 4, which is labelled "specified strip temperatures" according to the legend to FIG. 2.

Following this, in a step (iv), the method according to the invention according to the first embodiment checks whether the predicted austenite content is outside the quality window according to step (i). If this is the case, as mentioned above, at least one zone temperature of the furnace device 110 and/or the speed of the product in the conveying direction F is adjusted. This is preferably done in the manner of a regulation. This is done with the aid of block 4, as explained below.

For the first embodiment of the method according to the invention, step (iv) then further provides that a pre-control value, denoted by "21" in FIG. 2, is sent from block 4 to controller 6 for the zone temperatures of furnace device 110.

The arrow "23" in FIG. 2 symbolizes that the controller 7 receives information or data on the quality window for the austenite content (predicted at location II). In FIG. 2, "22" denotes the regulator output which is added to the aforementioned pre-control value 21.

In any case, in the first embodiment of the method according to the invention, the regulation of specific zone temperatures of the furnace device 110 and/or the speed of the product in the conveying direction F, in particular through the use of the controller 7, is carried out in such a way that the austenite content predicted for location II of the product P returns to or remains in the quality window of step (i). Optimally, the austenite content predicted for location II corresponds to the associated target value, which lies within the quality window between the maximum value and the minimum value (see also FIG. 8), or the predicted austenite content differs only slightly from this target value.

Figure 10:
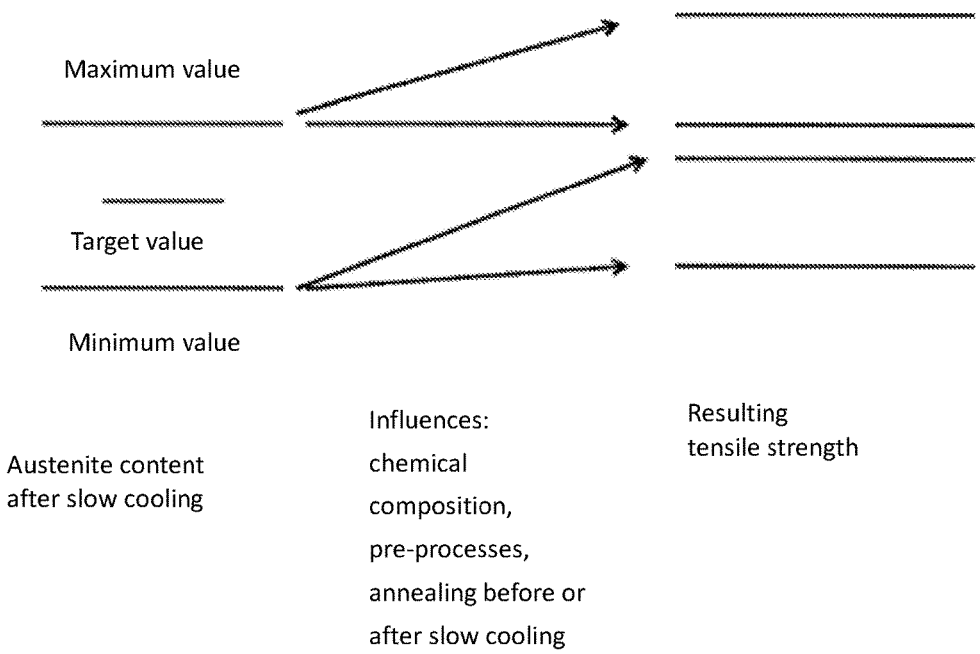

FIG. 8 shows a symbolic representation for a change in the mechanical properties of the product P, using the example of the resulting tensile strength after the product has been heat-treated with the method according to the invention according to the first embodiment. A comparison with FIG. 10 shows that the present invention enables reducing the effects of influences, for example on the resulting tensile strength, compared with the prior art.

With regard to blocks 3, 4 and 5, it is emphasized that a computing speed faster than real time has been selected or set for this purpose. This also applies mutatis mutandis to steps (ii) and (iii) of the method according to the invention.

The blocks 3, 4, 5 and 6 as well as the controller 7 are expediently permanently, and thus continuously, operated in the background for the heat treatment that is carried out for the product P with the furnace device 110. This makes it possible for the present invention to achieve an advantageously short reaction time with regard to possible changes in input parameters, particularly when a coil change is pending, by adjusting the control of the furnace device 110 or the strip speed at an early stage, for example. Such an early reaction, which is achieved with the regulation according to the invention as a function of the predicted austenite content at location II, is symbolized in the diagram of FIG. 7 by the dashed areas of the austenite content as a function of the cumulative coil length, in connection with the change from a coil A to a coil B.

Figure 3:
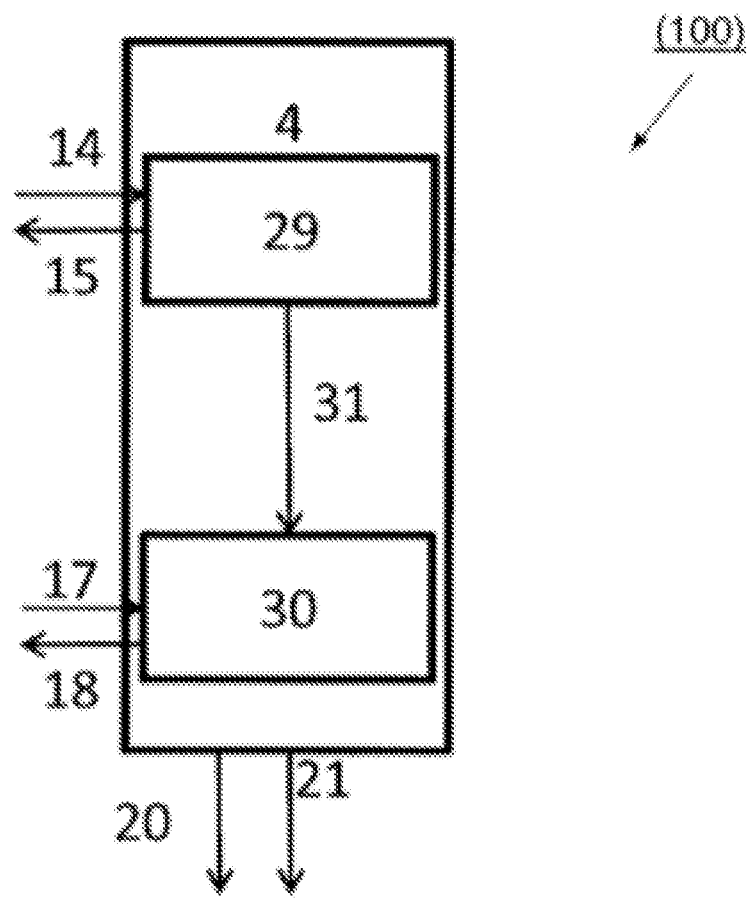

FIG. 3 shows a modified part of the control and/or regulating device 100 from FIG. 2, with reference to block 4. With this modification of the block, the first embodiment of the method according to the invention is also carried out, wherein dynamic temperature quality windows are derived based on austenite quality windows. The following supplementary legend is serves to explain FIG. 3:

29 Specification for quality window for strip temperatures (for the example for slow cooling according to the first embodiment)
30 Specification strip temperatures
31 Quality window for strip temperatures (for example for slow cooling according to the first embodiment)

The modified first embodiment of the method according to the invention essentially corresponds to the previously explained main variant of the first embodiment, with the strip temperatures (4) now being specified in the following manner: Quality windows are defined for the austenite content. These are derived from quality windows for the mechanical properties. In addition, the following steps take place:

Quality windows for the slow cooling strip temperature are determined from the austenite quality windows and the prediction for the austenite contents (29).
The window for the annealing temperature is a normal window or can be adjusted by the requirement for the austenite content or the capacity of the slow cooling via (31)
These dynamic quality windows are then used in the specification of the strip temperatures (30).

Figure 6:
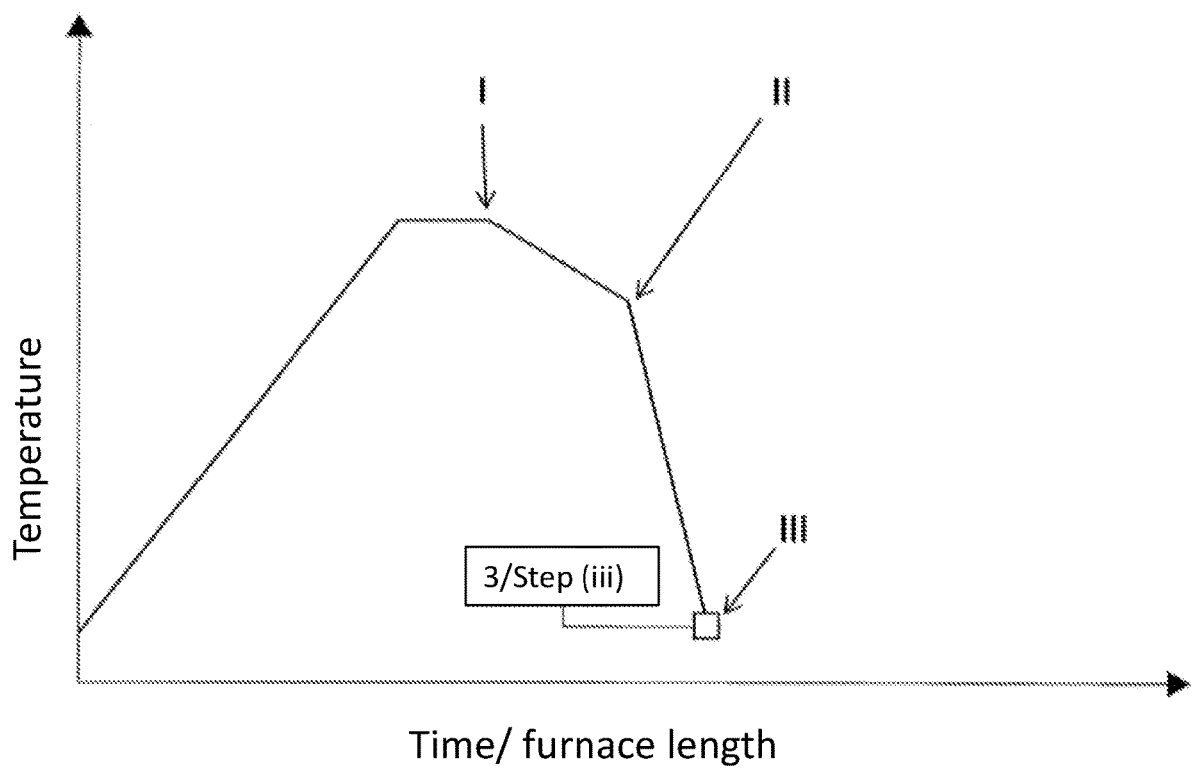
Figure 7:
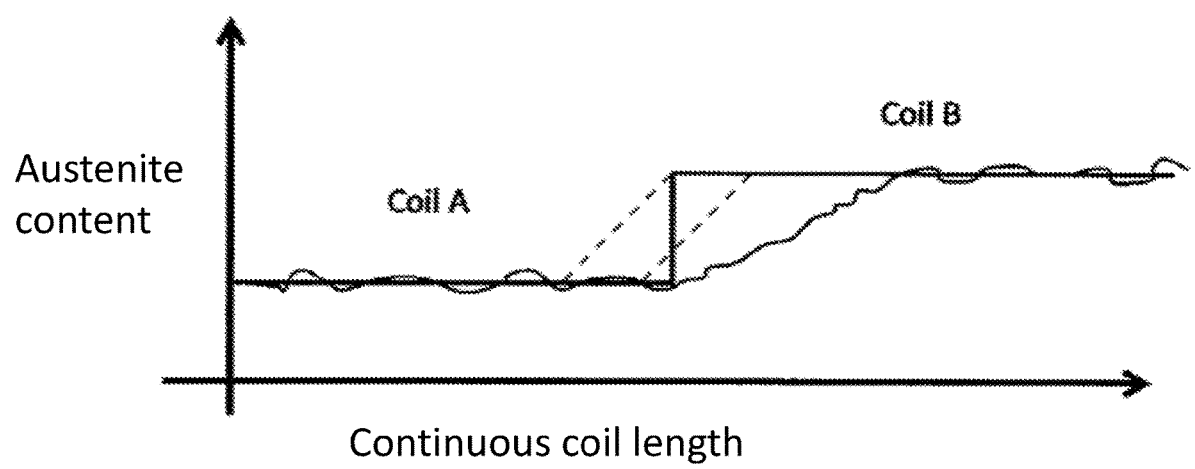

A second embodiment for the method according to the invention is shown in the diagram of FIG. 6 in relation to a possible temperature profile as a function of time or furnace length. This second embodiment is preferably carried out for quenching and partitioning steels ("Q&P steels") and is characterized in that step (iii) for predicting the austenite content is carried out only after the fast cooling has been completed and is therefore carried out at the third location. This is shown for the curve of the temperature profile in the diagram of FIG. 6 by positioning the designation "3/step (iii)" at location III. Furthermore, in the remaining steps (i), (ii) and (iv) of the method according to this second embodiment, the focus is of course exclusively on the third location in relation to the austenite content or the predicted temperature required therefore.

It is noted that the temperature profile established for the product P in the method according to the second embodiment can also deviate from the profile of FIG. 6. For example, it is possible that, in the second embodiment, slow cooling between the first location I and the second location II is carried out either in a different manner or does not take place at all. In the latter case, this means that, following the heating of the product P until reaching the first location I, rapid cooling then takes place directly until reaching the third location III, with a second location being absent or irrelevant.

Otherwise, the sequence of the method according to the second embodiment corresponds mutatis mutandis to the main variant of the first embodiment, so that reference is made thereto in order to avoid repetitions.

The present invention is particularly suitable for use in galvanizing lines, annealing lines or similar systems in which a metallic product, in particular in the form of a strip or sheet, is subjected to a heat treatment, the product being heated and/or cooled in a targeted manner. This means that the processing line B mentioned above can be a galvanizing line or an annealing line.

If the heating of the product P, which as explained takes place until reaching the first location I, is to be performed within a short time with correspondingly large temperature gradient, the invention can also use the inductor 112 (cf. FIG. 1) for this purpose. In this way, inductor 112 is used as a fast manipulated variable for the present invention. For induction-based heating, it is advantageous that the energy introduced into the metallic product P can be changed quickly.

Finally, with regard to the implementation of a method according to the present invention, it is pointed out that the austenite content for the product P at the second location II (in the first embodiment) or at the third location III (in the second embodiment) is also determined by measurement, preferably non-destructively through the use of X-rays. The result of this measurement is then sent to the controller 7 and is used to verify the values predicted for the second location II or third location III and to correct these values in the event of a deviation. This is expressed in the block diagram of FIG. 2 by block "9" the signal output of which is directed to the block of the controller 7 with arrow "26".

The invention claimed is:

1. A method for providing heat treatment of a metallic product along a processing line, the metallic product including one of a strip or a sheet, in which the metallic product is conveyed through a furnace device at an initial predetermined conveyance speed in a conveying direction, the furnace device being controlled and/or regulated by a control and/or regulating device for conveying, heating and cooling the metallic product, wherein the metallic product is conveyed and heated until reaching a first location in the furnace device and is then further conveyed and cooled until reaching a second location in the furnace device along the processing line, wherein the second location with respect to the conveying direction of the metallic product is downstream of the first location, the method comprising the steps of:

(i) determining a quality window with respect to an austenite content of the metallic product corresponding to the second location in the furnace device, wherein the determining the quality window includes defining a minimum value and a maximum value of the austenite content at the second location;

(ii) predicting, from a position upstream of the second location, a downstream temperature of the metallic product while being conveyed in the conveying direction, the downstream temperature corresponding to the second location and based on (a) a heat transfer equation as a function of an upstream temperature of the metallic product, the upstream temperature of the metallic product being determined at the position upstream of the second location, and/or (b) a conveyance speed of the metallic product while being conveyed through the furnace device;

(iii) predicting the austenite content of the metallic product at the second location by a metallurgical and/or data-based model on a basis of the downstream temperature of the metallic product as predicted according to step (ii); and (iv) adjusting, via the control and/or regulating device while the metallic product is being conveyed, (a) at least one zone temperature of the furnace device such that at least one of a heating treatment and a cooling treatment is applied to the metallic product upstream of the second location, and/or (b) a present conveyance speed of the metallic product along the conveying direction to a different conveyance speed through the furnace device, said adjusting occurring in an instance at which the austenite content of the metallic product predicted for the second location, according to step (iii), has a value outside the quality window of step (i) such that, after said adjusting of the at least one zone temperature of the furnace device and/or the conveyance speed of the metallic product along the conveying direction, the austenite content of the metallic product predicted for the second location subsequently has a value within the quality window.

2. The method according to claim 1, wherein a computing speed for step (ii) and/or for step (iii) is selected to be in real time.

3. The method according to claim 1, wherein the adjusting according to step (iv) takes place in a manner of a regulation, wherein the control and/or regulating device functions as a regulator, and the at least one zone temperature of the furnace device and/or the conveyance speed of the metallic product in the conveying direction each serve as a manipulated variable.

4. The method according to claim 1, wherein the minimum value and the maximum value for the quality window according to step (i) in relation to at least one mechanical property of the metallic product is measured, wherein the at least one mechanical property of the metallic product includes tensile strength and/or yield point and/or elongation characteristics of the metallic product.

5. The method according to claim 1, wherein an austenite target value for the metallic product is selected to occur within the quality window according to step (i), wherein the austenite target value is determined based on a measured value.

6. The method according to claim 5, wherein the adjusting according to step (iv) occurs such that the austenite content of the metallic product predicted for the second location corresponds to the austenite target value.

7. The method according to claim 1, wherein the metallic product is further cooled while being conveyed along the conveying direction to a third location in the furnace device, wherein the second location, as viewed in the conveying direction of the metallic product, is located between the first location and the third location, the metallic product being cooled slowly at a first rate between the first location and the second location and being cooled at a second rate between the second location and the third location, wherein the second rate is greater than the first rate.

8. The method according to claim 7, wherein the metallic product is fabricated from steel which has a mass fraction of silicon of at least 0.3% and a mass fraction of manganese of at least 1%.

9. The method according to claim 8, wherein the mass fraction of silicon is in a range of 0.30% to 1.5%.

10. The method according to claim 8, wherein the mass fraction of manganese is in a range of 1.01% to 2%.

11. The method according to claim 8, wherein a sum of the mass fraction of silicon and the mass fraction of manganese is in a range of 1.30% to 2.5%.

12. The method according to claim 7, wherein the austenite content of the metallic product at the second location is taken into account for carrying out steps (i) to (iv).

13. The method according to claim 7, wherein the adjusting according to step (iv) is carried out taking into account a cooling capacity by a slow-speed conveyance between the first location and the second location within the furnace device, wherein the slow-speed conveyance is less than a previous conveyance speed of the metallic product along the processing line.

14. The method according to claim 1, wherein the heat treatment of the metallic product is provided by at least one inductor, which is controlled or regulated by the control and/or regulating device, wherein the at least one inductor is arranged either inside the furnace device and/or, as viewed in the conveying direction of the metallic product, upstream and/or downstream of the furnace device.

15. The method according to claim 1, wherein the austenite content for the metallic product at the second location is determined by measurement, wherein the measurement of the austenite content at the second location takes place non-destructively through an application of X-rays.

16. The method according to claim 1, wherein a coil change for the metallic product occurs at the second location.

17. The method according to claim 1, wherein slow-speed cooling of the metallic product at a first rate occurs between the first location and the second location and the slow-speed cooling of the metallic product at the first rate ends at the second location.

18. The method according to claim 1, wherein rapid cooling of the metallic product at a first rate occurs between the first location and the second location and the rapid cooling of the metallic product at the first rate ends at the second location.

19. A method for providing heat treatment of a metallic product, the metallic product including one of a strip or a sheet, in which the metallic product is conveyed through a furnace device of a processing line at an initial predetermined conveyance speed in a conveying direction, the furnace device being controlled and/or regulated by a control and/or regulating device for conveying, heating and cooling the metallic product, wherein the metallic product is conveyed and heated until reaching a first location and is then conveyed and cooled until reaching a second location in the furnace device, wherein the second location with respect to the conveying direction of the metallic product is downstream of the first location, the method comprising the steps of:

(i) determining a quality window with respect to an austenite content of the metallic product at the second location in the furnace device, wherein the determining the quality window includes defining a minimum value and a maximum value of the austenite content at the second location;

(ii) conveying the metallic product through the furnace device along the processing line at the initial conveyance speed in the conveying direction;

(iii) predicting, from a position upstream of the second location, a downstream temperature of the conveyed metallic product corresponding to the second location based on (a) a heat transfer equation as a function of an upstream temperature of the metallic product that is also at a position upstream of the second location, and/or (b) a present conveyance speed of the metallic product through the furnace device to a different conveyance speed therethrough, wherein the initial predetermined conveyance speed is one of greater than, less than or equal to the present conveyance speed; and (iv) predicting the austenite content of the metallic product at the second location by a metallurgical and/or data-based model on a basis of the downstream temperature as predicted according to step (iii).

20. The method according to claim 19 further comprising:

(v) adjusting, via the control and/or regulating device, (a) at least one zone temperature of the furnace device such that at least one of a heating treatment and a cooling treatment is applied to the metallic product upstream of the second location and/or (b) the present conveyance speed of the metallic product along the conveying direction to a different conveyance speed through the furnace device, in an instance at which the austenite content of the metallic product predicted for the second location, according to step (iv), has a value outside the quality window of step (i) such that, after said adjusting of the at least one zone temperature of the furnace device and/or the present conveyance speed of the metallic product along the conveying direction, the austenite content of the metallic product predicted for the second location subsequently has a value within the quality window.

* * * * *